April 18, 1961 S. PUCCINELLI 2,980,233
APPARATUS FOR HANDLING FRUIT
Filed July 25, 1957 2 Sheets-Sheet 1
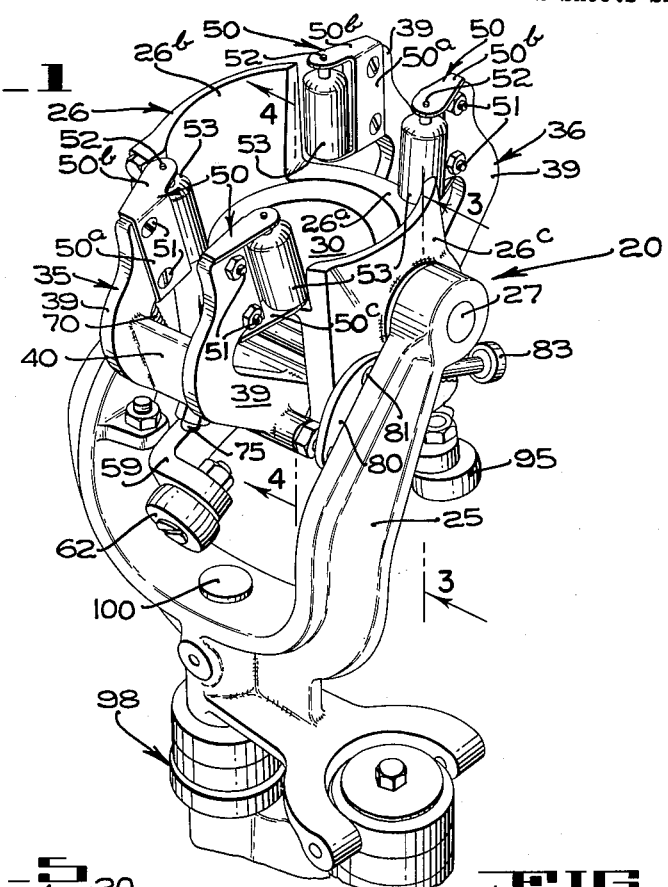
INVENTOR
SYLVIO PUCCINELLI
BY Hans G. Hoffmeister
ATTORNEY April 18, 1961  S. PUCCINELLI  2,980,233
APPARATUS FOR HANDLING FRUIT
Filed July 25, 1957  2 Sheets-Sheet 2
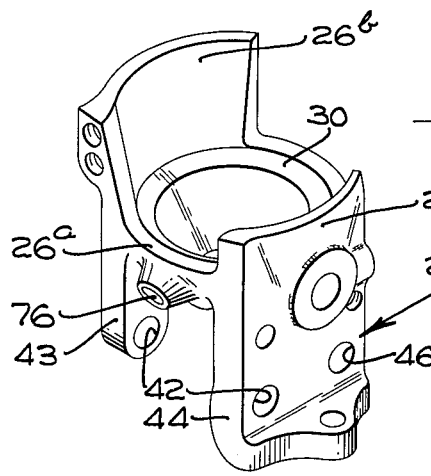
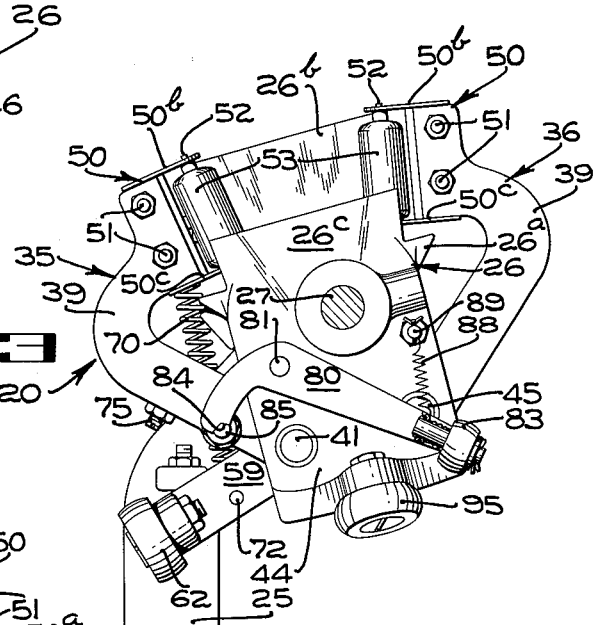
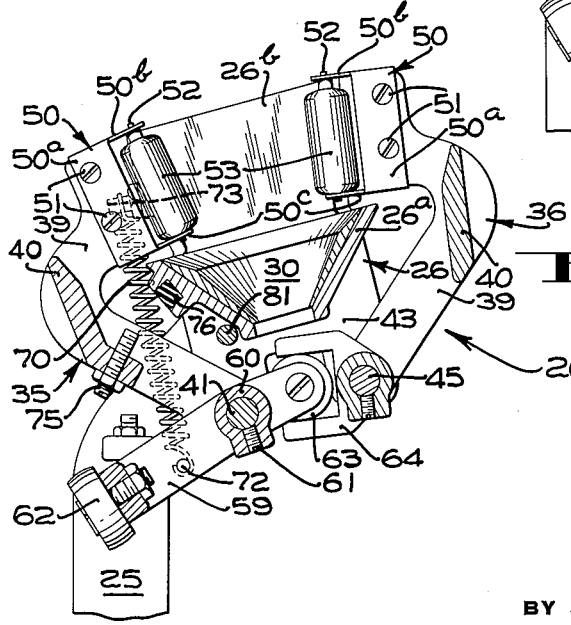
INVENTOR
SYLVIO PUCCINELLI
ATTORNEY

United States Patent Office 2,980,233
Patented Apr. 18, 1961

2,980,233

APPARATUS FOR HANDLING FRUIT

Sylvio Puccinelli, San Jose, Calif., assignor to Food Machinery and Chemical Corporation, San Jose, Calif., a corporation of Delaware Filed July 25, 1957, Ser. No. 674,108

13 Claims. (Cl. 198—33)

This invention pertains to apparatus for handling fruit and more particularly relates to apparatus for carrying fruit, such as pears, through a fruit processing machine.

In one method of carrying fruit through a processing machine, the fruit is gripped in a pair of oppositely disposed movable jaws or clamp members. These jaws are moved away from each other to an open fruit-receiving position, and then are moved toward each other to a closed position to grip the fruit. As the jaws move to closed position, the fruit must automatically adjust itself so that it is in a centered position when the jaws are closed. In fruit carriers presently in use, the fruit contacting surfaces of the jaws provide a considerable amount of frictional resistance to the free movement of the fruit during closing of the jaws. Accordingly, in many instances the fruit does not attain a centered position and remains in a canted position which prevents the complete closing of the jaws. If the jaws are not completely closed and the fruit is not centered and firmly gripped, the subsequent operations on the fruit will be seriously affected since peeling, coring and similar operations depend upon the exact positioning of the fruit.

It is therefore an object of the present invention to provide an improved fruit carrier.

Another object is to provide a fruit carrier having means for accurately centering the fruit in the carrier.

Another object is to provide a fruit carrier having a minimum of frictional, fruit contacting surfaces.

Other and further objects and advantages of the present invention will become apparent from the following description taken in connection with the accompanying drawings, in which:

Fig. 1 is a perspective of a fruit carrier constructed in accordance with the teaching of the present invention.

Fig. 2 is a perspective of the main body portion of the fruit carrier of Fig. 1, shown removed from the carrier assembly.

Fig. 3 is a vertical section taken on line 3—3 of Fig. 1.

Fig. 4 is a vertical section taken on line 4—4 of Fig. 1.

Figs. 5, 6 and 7 are reduced, diagrammatic operational views illustrating a series of steps in the operation of the movable jaws of the fruit carrier of Fig. 1, when a fruit disposed therein lies against one jaw member only.

Fig. 8 is a reduced diagrammatic plan view, similar to Fig. 5, showing the fruit carrier of Fig. 1 associated with a fruit that has been positioned against one side wall of the carrier.

The fruit carrier of the present invention is an improvement of the fruit carrier described and claimed in the application of Creed et al., Serial No. 625,368, filed November 30, 1956.

In Fig. 1 the fruit carrier assembly of the present invention is indicated generally by reference numeral 20 and comprises a rigid yoke 25 in which a rigid body member 26 (Fig. 2) is pivotally mounted on aligned pins 27 (only one pin being shown). The body member 26 has a central, frusto-conical guide portion 26a (Figs. 2 and 4) and two partially cylindrical walls 26b and 26c that extend upwardly from opposite sides of the upper edge of the guide portion 26a. A removable, frusto-conical insert 30 (Fig. 4) is disposed in the guide portion 26a. It will be evident that the size of the insert may be varied according to the size of the pears being processed.

Two movable jaws or clamp members 35 and 36 (Fig. 1) are pivotally mounted on the body member 26. These jaws are identical, but are oppositely disposed, each jaw comprising a pair of bent arms 39 which are connected by a strap 40. Near their lower ends, the arms 39 of the movable jaw 35 are keyed to a shaft 41 (Fig. 4) which is rotatably journalled at its ends in aligned apertures 42 (Fig. 2) provided in depending legs 43 and 44 of the rigid body member 26. Similarly, the arms 39 of the jaw 36 are keyed to a shaft 45, (Fig. 4) which is supported in aligned apertures 46 in the legs 43 and 44, one aperture only being shown. At its upper end, each of the four arms 39 carries a racket 50 which is secured to the arm by bolts 51. The bracket 50 has a body portion 50a, an upper flange or arm 50b and a lower flange 50c. A pin 52 extends between the arms 50b and 50c and is retained in the arms adjacent their end portions by any suitable means, as by peening over the ends of the pin. A cylindrical roller 53, made of nylon or a similar material having a hard, smooth surface, is rotatably and slidably mounted on each pin 52.

Referring to Fig. 1 it will be noted that the fruit receiving opening of the carrier 20 is defined by the four cylindrical rollers 53 and by the two opposed curved wall portions 26b and 26c.

The movable jaws 35 and 36 are pivoted relative to each other by an actuator arm 59 (Fig. 4) that has a hub 60 secured to the shaft 41 by a set screw 61. At one end, the actuator arm 59 (Fig. 4) carries a cam follower roller 62 and, at the other end, it carries a rotatable roller 63 that is disposed in a socket in a U-shaped member 64 which is secured to the shaft 45. It will be evident that, when the actuator arm 59 is pivoted in a counterclockwise direction (Fig. 4) about the axis of shaft 41, the jaws 35 and 36 will be moved away from each other to an open position suitable to receive a pear placed therein by an operator. Similarly, when the actuator arm 59 is pivoted clockwise, the jaws which are spaced equidistantly from the axis of the carrier, move toward each other with a coordinated action causing the fruit to be shifted to a centered position in the carrier.

The actuator arm 59 is pivoted counterclockwise to open the jaws by means of a cam (not shown) which has been described and claimed in the above-mentioned application. This movement is made against the resistance of a spring 70 (Fig. 4) which is anchored at one end on a pin 72 projecting from the actuator arm 59 and, at the other end on a pin 73 projecting from the rigid body member 26. Accordingly, as soon as the roller follower moves out of engagement with its associated cam, the spring 70 moves the jaws 35 and 36 to a closed position wherein an adjustable stud 75, carried by the strap 40 of the jaw 35, abuts a resilient pad 76 which is maintained in a recess in the exterior wall of the frusto-conical guide portion 26a.

During a certain portion of the travel of the carrier through the fruit processing machine on which it is mounted, the jaws are latched in an open, fruit-receiving position by means of a latch arm 80 (Fig. 3) that is mounted for pivotal movement on a pin 81 projecting from the body portion 26. A cam follower roller 83 is mounted for rotation on one end of the latch arm 80, and a V-shaped notch 84 is formed in the other end of the arm 80. A pin 85, projecting from one arm 39 of the jaw 35, has a peaked upper portion arranged to engage in the V-shaped notch 84 to lock the jaws 35 and 36 in the open position of Fig. 3. A tension spring 88 is connected between the arm 80 and a pin 89 projecting from the body portion 26 and is arranged to urge the arm 80 in a counterclockwise direction about pin 81. Accordingly, when the actuator arm 59 is being cammed to jaw-open position, the notch 84 of the latch arm 80 is resiliently urged into engagement with the peaked portion of the pin 85 to latch the jaws in open position.

Also, during the movement of the fruit carrier through the processing machine, it is tilted to various positions by means of the engagement of a cam follower roller 95 (Fig. 3) that is mounted for rotation on the lower end of the body member 26. The carrier is moved through the processing machine by means of an endless chain conveyor 98 (Fig. 1) which is operatively connected to the yoke 25 of the carrier through a pin 100. The details of the design and construction of the cams which cooperate with the jaw opening cam follower 62, the cam follower 83 of the latch 80, and the cam follower roller 95 which tilts the carrier, are disclosed in the previously mentioned patent application Serial No. 625,368.

Referring to the operational views of Figs. 5, 6 and 7, it will be seen that, when the jaws 35 and 36 are in an open position, a pear P may be easily dropped into the carrier stem end down. In Figs. 5 and 6 a condition is shown wherein the stem end of the pear is disposed on the frusto-conical cup insert 30 and the butt end of the pear is lying against the rollers 53 of the arms of the jaw assembly 35. When the jaws are moved toward the closed position of Fig. 7, the surfaces of the pear, that are in contact with the rollers 53, will move a certain distance upwardly due to the pivotal movement of the pear about its stem end. The rollers 53, which normally would move along a somewhat flatter arc, will slide upwardly along the associated pins 52 to accommodate the upward movement of the surface portions of the pear which they are contacting. This upward movement of the rollers allows the pear to move freely toward a central position between the jaws, and therefore cocking or canting of the pear in the closed carrier or cup is avoided.

Referring to Fig. 8 a condition is shown, wherein a pear P₁ has been dropped into the carrier and is lying against the body portion 26c and between a roller of each of the jaws 35 and 36. Again it will be evident that, as the jaws 35 and 36 move toward closed position, the rollers 53 that are in contact with the pear will slide upwardly along their associated pins 52 to accommodate any upward movement of the pear. Further, since the pear in moving toward upright position will be displaced laterally from the contacting rollers 53, the rollers 53 will rotate about the pins 52 and permit the free lateral adjustment of the pear.

From the foregoing description it will be seen that the freely rotatable, slidably mounted rollers 53 of the present fruit carrier have a minimum amount of frictional engagement with the pear and are free to rotate and slide upwardly to accommodate the self-adjusting movement of the pear in the closing jaws of the carrier.

While a preferred embodiment of the fruit carrier of the present invention has been shown and described, it will be understood that the carrier is capable of modification and variation while still employing the principles of the invention. It is to be understood therefore that the scope of the invention should be limited only by the scope and proper interpretation of the claims appended hereto.

The invention having thus been described, that which is believed to be new and for which protection by Letters Patent is desired is:

1. In a fruit carrier of the type employing jaws pivotally mounted for swinging movement toward each other to engage and center a fruit about a predetermined axis substantially normal to the direction of movement of said jaws: the improvement comprising a fruit contacting member slidably mounted on each jaw for bodily self-adjusting sliding movement when in contact with the fruit, the sliding movement of said member being along an axis substantially normal to the direction of swinging movement of said jaws to accommodate axial movement of the fruit.

2. In a fruit carrier of the type employing clamp members mounted for pivotal movement toward each other for engaging and shifting a fruit disposed in the carrier, the improvement which comprises a cylindrical fruit contacting roller mounted on each clamp member for free rotation thereon and for free sliding movement in an axial direction while in engagement with the fruit during pivoting of said arms.

3. A fruit carrier comprising a rigid fruit support member having a surface for engaging the surface of a fruit to pivotally support the fruit, a pair of arms pivotally mounted on said fruit support member for swinging movement toward and away from each other to engage the fruit deposited therebetween in said support member, and a fruit contacting member mounted on each arm for sliding movement along an axis substantially normal to the direction of swinging movement of said arms, said fruit contacting member being arranged to engage the deposited fruit to pivot the fruit about its supported surface to a centered position between said arms.

4. A fruit carrier comprising a rigid body member arranged to support a fruit for pivotal movement about a predetermined axis, a pair of arms pivotally mounted on said body member for swinging movement in a direction normal to said predetermined axis, a fruit contacting member slidably mounted on each arm for free self-adjusting movement thereon along an axis substantially normal to the direction of swinging movement of said arms, and means for simultaneously swinging said pair of arms toward each other to move said slidable fruit contacting members and the fruit in contact therewith toward a centered position on said predetermined axis, the sliding movement of said fruit contacting members while in engagement with the fruit permitting bodily movement of the fruit about said predetermined axis.

5. A fruit carrier comprising a rigid symmetrical fruit support member, a pair of spaced clamp members, means mounting said clamp members on said support member in a manner to permit relative movement between said clamp members to engage a fruit deposited in said support member between said clamp members and move the fruit to a position centered about the axis of symmetry of said symmetrical fruit support member, and a fruit contacting member movably mounted on each clamp member and arranged to slide upwardly in substantially the same direction as the upward direction of the axis of symmetry of said support member when said fruit contacting member is disposed in engagement with the fruit during movement of the fruit to said centered position in said support member.

6. A fruit carrier comprising a body member having a pair of spaced opposed fragmentary cylindrical surfaces, a pair of arms pivotally mounted on each side of said body member, a pair of fruit-contacting members slidably and rotatably mounted on each arm, said two fragmentary cylindrical surfaces and said four fruit-contacting members cooperating to define a fruit-receiving chamber, and means for moving said arms toward each other to cause a fruit in said chamber to be clamped between said arms.

7. A fruit carrier comprising a body member, a pair of jaws pivotally mounted in opposed relation on said body member, a bracket secured to each jaw member and having two opposed spaced flanges, a pin disposed between said flanges, and a cylindrical roller slidably mounted on said pin, the length of said roller being less than the distance between said flanges.

8. A fruit carrier comprising a rigid body member, a pair of clamp members pivotally mounted in opposed relation on said body member, and means for pivoting said clamp members toward each other to clamp a fruit disposed in said body member, each clamp member including an arm, a bracket mounted adjacent one end of said arm, a pin mounted in said bracket, and a roller rotatably and slidably mounted on said pin for self-adjusting movement.

9. In a fruit carrier, a support member, means defining a frusto-conical surface on said support member adapted to receive the stem end of a pear, a pair of clamp members mounted on said support member for coordinated movement toward an extension of the axis of said frusto-conical surface, a fruit-contacting member slidably mounted on each clamp member, and means for moving said clamp members toward each other, whereby the fruit-contacting member engaging the butt end of a pear resting on said frusto-conical support will pivot the pear on its stem end and move it to centered position between said fruit-contacting members.

10. A fruit carrier comprising a rigid body member, means defining a frusto-conical support surface in said body member adapted to receive a lower portion of a fruit deposited in said body member, a pair of arms pivotally mounted on opposite sides of said body member equidistantly from an extension of the axis of said frusto-conical support surface, a fruit-contacting member slidably and rotatably mounted on each arm, and means for moving said oppositely disposed arms toward each other to clamp the upper portion of the fruit between said fruit contacting members, whereby the lower portion of the fruit is shifted on saidf rusto-conical support surface and the upper portion is moved to a centered position relative to the extension of the axis of said support surface.

11. In a fruit carrier, a support member having a socket adapted to receive the stem end of a pear and support it for pivotal movement about a fixed axis, a pair of clamp members mounted on said support member for coordinated movement toward an extension of the axis about which the fruit pivots, a fruit-contacting member slidably mounted on each clamp member, and means for moving said clamp members toward each other, whereby a fruit-contacting member engaging the butt end of the pear resting in said socket will pivot the pear on its stem end and move it to centered position between said fruit-contacting members.

12. In a fruit carrier, a pair of arms mounted at one end for pivoting movement toward and away from each other, each arm having a fruit-contacting member at its free end, means for supporting a fruit for pivotal movement between said arms, the pivot axis of the fruit being disposed between the pivot axis of said arms and said fruit-contacting members whereby the portion of the fruit between said fruit-contacting members will move on a different arc than the arc of movement of said fruit-contacting members, and means mounting each fruit-contacting member for movement relative to the associated arm to permit movement of the fruit along said different arc.

13. In a fruit carrier of the type wherein a symmetrical support member is adapted to receive a pear stem-end-down and support it for pivotal movement to an upright position, and wherein two levers are pivoted about an axis disposed on one side of said support member and carry two opposed jaw members on the other side of said support member, said jaw members being arranged to move toward each other during pivoting of said levers to contact and move the pear to upright position, the improvement which comprises pear contact members mounted on said levers for movement relative to said levers in a direction to permit said pivotal movement of a pear in the support member.

References Cited in the file of this patent

UNITED STATES PATENTS

| | | |
|---|---|---|
| 2,158,545 | Kieweg | May 16, 1939 |
| 2,298,955 | Mason | Oct. 13, 1942 |
| 2,526,712 | Thompson | Oct. 24, 1950 |
| 2,655,401 | Kelso | Oct. 13, 1953 |

FOREIGN PATENTS

| | | |
|---|---|---|
| 544,207 | Great Britain | Apr. 1, 1942 |